3,453,080
METHOD OF PREPARING COMPOUNDS WHICH CONTAIN A NITROGEN-FLUORINE BOND
Barry R. Bronfin, Weathersfield, Conn., assignor to the United States of America as represented by the Secretary of the Navy
No Drawing. Filed Nov. 29, 1965, Ser. No. 510,464
Int. Cl. C01b 21/52, 9/08
U.S. Cl. 23—205                                    1 Claim

ABSTRACT OF THE DISCLOSURE

A method of preparing nitrogen-fluorine compounds in which a flowing stream of mixed nitrogen plasma and carbon terafluoride or sulfur hexafluoride is held at high temperature for a short period of time and the reaction mixture rapidly quenched.

---

The invention described herein may be manufactured and used by or for the Government of the United States of America for governmental purposes without the payment of any royalties thereon or therefor.

This invention relates to a method for the preparation of compounds which contain a nitrogen-fluorine bond.

The inorganic nitrogen-fluorine compounds, nitrogen trifluoride, $NF_3$, and tetrafluorohydrazine, $N_2F_4$, are gases and cryogenic oxidizers for liquid rocket-propellants. Nitrogen trifluoride also is a starting material for the preparation of tetrafluorohydrazine. The organic nitrogen-fluorine compound, perfluoromethylamine, $CF_3NF_2$, is a gas and a starting material for the preparation of other nitrogen-fluorine compounds which are cryogenic oxidizers for liquid rocket-propellants.

The present commercial method for the synthesis of nitrogen trifluoride involves electrolysis of molten ammonium bifluoride. The main disadvantages of the method are low yield and awkwardness of molten salt electrolysis which contribute to a high production cost for nitrogen trifluoride. It is obviously desirable to have a lower cost method for the production of nitrogen trifluoride.

It is an object of the present invention to provide a new method for the synthesis of compounds which contain a nitrogen-fluorine bond. It is also an object to prepare such compounds in a simple manner. It is a further object to synthesize such compounds using a readily available and low cost starting material. It is a particular object to provide a method for the synthesis of nitrogen trifluoride in a simple and more economical manner.

The above and other objects are accomplished by the practice of the method of the invention which comprises passing a mixture of nitrogen plasma and a gaseous fluoride which may be carbon tetrafluoride, $CF_4$, or sulfur hexafluoride, $SF_6$, through a hot zone at a temperature of from about 1500 to 1600° K. in the substantial absence of any other reactive material and with a residence time in the hot zone of not exceeding 0.1 second and rapidly cooling the gaseous reaction mixture to a temperature of 500° C. or below to obtain compounds which contain a nitrogen-fluorine bond.

In operation of the method of the invention, a stream of hot nitrogen plasma is formed by heating dry nitrogen to plasma temperatures, which may be from about 7000 to 15000° K., by a suitable heating device and cold gaseous fluoride is introduced into the hot plasma stream in amount to form therewith a mixture having a temperature of from about 1500 to 6000° K. The residence time for the mixture at temperatures of 1500 to 6000° K. or, as may be otherwise expressed, in the hot zone, is very short and may be of the order of .001 second. The residence or contact time is determined by the rapid cooling or quenching of the reaction mixture.

The method may be operated at atmospheric pressure or at subatmospheric or superatmospheric pressures. The ratios of gas feeds of nitrogen and fluoride in operation of the method may be varied considerably. A preferred range of operation of the gas feeds provides mole rations of nitrogen to fluoride in the method of 10:1 to 1:4.

A preferred device for producing a stream of nitrogen plasma is an electric arc plasma generator. These generators have means for upstream feeding of the gas to the arc. They are commercially available. In one such generator (Model F-40 Plasma Torch-Thermal Dynamics Corp.) an electric arc is maintained between a cylindrical cathode and an annular anode. The cathode is made of thoriated tungsten and the anode of copper. The nitrogen gas is introduced through a port upstream to pass through an approximately ¼ inch annular gap provided by the design of the electrodes where the nitrogen is mixed with and heated by the arc to form the plasma. The electrodes and other parts of the electric arc are water-cooled to protect them from attack by the nitrogen plasma.

A suitable apparatus for carrying out the method of the invention comprises the above-mentioned F-40 electric arc plasma generator which has been modified at the anode to provide means for introducing the gaseous fluoride into the hot nitrogen plasma jet a short distance downstream from the anode, and a sealed chamber attached to the electric arc plasma generator for receiving and rapidly cooling the gaseous reaction products.

Mounted directly on the anode of this electric arc generator is a fitting which provides for injection of the gaseous fluoride into the nitrogen plasma jet a short distance downstream from the anode, for example, at a distance of ⅛ inch downstream. This fitting may be a circular metal plate which abuts the end face of the anode and has central bore in alignment with the orifice of the anode. The gaseous fluoride is passed to the nitrogen plasma jet through a pair of small diameter holes, e.g., ⅛ inch diameter, which extend through the circular plate from the circumference to the central bore.

The sealed chamber for receiving and rapidly cooling the hot gaseous reaction mixture may be attached to the circular metal plate on the anode of the electric arc plasma generator and with a central opening arranged in alignment with the central bore in the circular plate and the orifice of the anode, whereby the jet of reaction mixture may exhaust directly thereinto. The chamber is made of a non-reactive material. Metal or heat-refractive glass chambers are suitable. An outlet is provided at the bottom of the chamber for withdrawal of the cooled product mixtures.

Cold surfaces for quenching of the hot, gaseous reaction mixture may be provided by circulating cold water through pipe lines coiled on and about the walls of the sealed chamber. Instead of cold water, other fluid refrigerants may be flowed through the pipe lines, such as liquid nitrogen.

Mounted within the sealed chamber and along the central axis of the plasma jet is a long, stainless steel, water-cooled tube of the kind described by Plooster and Reed, J. Chem. Physics, 31, 66–72 (1959) and by Grey, Jacobs and Sherman, Rev. Sci. Inst., 33, 738–41 (1962). This tube is arranged with its front end or tip at a short distance from the orifice of the anode of the plasma generator, e.g., about ½ inch. The inner tube within the water jacket may have an inner diameter of .032 inch. In operation of the method of the invention, hot gaseous reaction mixture is drawn into the inner tube, quenched to about 25° C. and the cooled gas mixture withdrawn for analysis. The analysis may be carried out by gas chromatography.

A direct current source is used for delivering power to the electric arc in the plasma generator, suitably a 35 kw. DC power supply. The arc is initiated in the annular gap by application of a high voltage, high frequency current. The arc may be operated at voltages in the range of 40 to 80 volts and with currents in the range of 60 to 500 amperes. Power requirements will depend on the quantity of gas passing through the arc and the temperature desired in the plasma. Flow rates for nitrogen feed to the arc may range from about 25 to 100 cubic feet per hour (STP). Using low flow rates of nitrogen gas and low electric power input levels to the arc, a steady quiet luminous flame or plasma jet is formed as the heated gas leaves the orifice of the anode. Using high flow rates of gas and high power input levels to the arc, a noisy, turbulent plasma jet forms in front of the anode orifice. This turbulent mode of operation of the arc generator is preferred.

In an alterative procedure, the nitrogen and gaseous fluoride are premixed and fed in the one step upstream of the arc, to the electric arc plasma generator. However, this procedure is not recommended if the heated mixture is likely to be corrosive to the electrodes of the generator.

High yields of compounds which contain a nitrogen-fluorine bond are favored by a rapid cooling (quenching) of the gaseous reaction mixture. The rapid cooling should be conducted to 500° C. or lower, for example, to about 25° C., in less than 1 second, preferably in a period of between 0.01 and 0.0001 second.

The invention is further illustrated and in greater detail by the following specific examples. The apparatus employed was that as described above including the electric arc plasma generator modified to introduce the gaseous fluoride into the nitrogen plasma jet downstream from the orifice of the anode with attached water-cooled sealed chamber for receiving and rapidly cooling the hot stream of reaction mixture. The sealed chamber had a volume of 1/10 cubic foot. A 10 inch long water-cooled stainless steel tube or quenching probe of the kind described above in which the I.D. of the inner tube was .032 inch was axially arranged in the line of the stream of the hot reaction mixture and with its tip at a distance of about ½ inch downstream from the orifice of the anode of the generator. Gas volumes are at standard temperature and pressure.

Example 1

Dry nitrogen gas was fed at 100 cubic feet per hour to the arc of the plasma generator, operating at 60 volts and 330 amperes, and at 1 atmosphere pressure. After the resulting nitrogen plasma had left the arc zone and at about ⅛ inch downstream therefrom, dry carbon tetrafluoride was introduced into the plasma jet at a feed rate of 10 cubic feet per hour. At a distance of about ½ inch downstream from the orifice of the anode, hot reaction gas mixture was drawn into the inner tube of the 10″ long water-cooled tube and cooled to about 25° C. Samples of the cooled gas mixture at the end of the tube were analyzed by gas chromatography. The analysis was nitrogen trifluoride, 0.2 mole percent; perfluoromethylamine, 0.8 mole percent; tetrafluorohydrazine, 0.1 mole percent; hexafluoroethane, 0.1 mole percent. Small quantities of cis- and trans-difluorodiazine and of tetrafluoroethylene were also found. Other products were nitrogen and carbon tetrafluoride.

Example 2

Dry nitrogen gas was fed at 100 cubic feet per hour to the arc of the plasma generator operating as described in Example 1. After the resulting nitrogen plasma jet left the arc zone and at a distance of about ⅛ inch downstream therefrom, dry sulfur hexafluoride was introduced into the plasma jet at a feed rate of 10 cubic feet per hour. Hot reaction gas mixture was withdrawn and cooled in the tube as in Example 1. The product analysis via gas chromatography was nitrogen trifluoride, 1.0 mole percent and tetrafluorohydrazine, 0.1 mole percent. Small quantities of cis- and transdifluorodiazine were also found. Other products were nitrogen and sulfur hexafluoride.

While the yield of compounds which contain a nitrogen-fluorine bond is low per volume of the product mixture, the time required for formation of the compounds is very short. By the use of nitrogen, a low cost, readily available gas, and operating the method on a rapid through-put basis, nitrogen trifluoride and tetrafluorohydrazine can be produced at a cost per pound which is substantially less than of the present commercial methods for producing these compounds.

While the method of the invention has been described herein with reference to certain specific embodiments thereof, the same are intended by way of illustration and not in limitation except as may be defined in the appended claim.

What is claimed and desired to be secured by Letters Patent of the United States is:

1. A method for preparing compounds which contain a nitrogen-fluorine bond which comprises flowing a mixture of nitrogen plasma and gaseous sulfur hexafluoride through a hot zone at a temperature of about 1,500 to 6,000° K., in the substantial absence of any other reactive substance and with a residence period in said zone not exceeding 0.1 second and rapidly cooling the stream of hot reaction products to obtain at least one member of the group consisting of nitrogen trifluoride and tetrafluorohydrazine, said mixture of nitrogen plasma and sulfur hexafluoride having been prepared by flowing nitrogen into an electric arc operating at temperatures which convert the nitrogen into a nitrogen plasma jet having a temperature up to about 15,000° K., and introducing the gaseous sulfur hexafluoride into the nitrogen plasma jet a short distance down stream from the orifice of the anode and in amount to form a nitrogen plasma-sulfur hexafluoride mixture having a temperature from about 1,500 to 6,000° K.

References Cited

UNITED STATES PATENTS

| | | | |
|---|---|---|---|
| 3,043,662 | 7/1962 | Lipscomb | 23—203 |
| 3,304,248 | 2/1967 | Fullam | 204—178 |

OTHER REFERENCES

Simons, J. H., et al.: Fluorine Chemistry, p. 360, Academic Press, New York, N.Y. 1954.

Brasted, R. C.: Comprehensive Inorganic Chemistry, vol. 3, p. 35, D. Van Nostrand, Princeton, N.J. 1957.

OSCAR R. VERTIZ, *Primary Examiner.*

G. O. PETERS, *Assistant Examiner.*

U.S. Cl. X.R.

204—177